Figure 1:
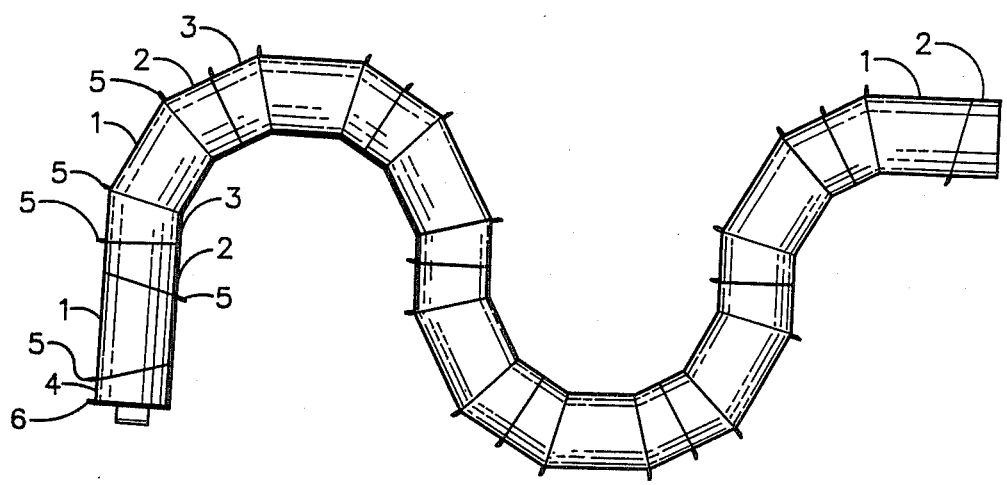

United States Patent [19]

Trimble

[11] Patent Number: 4,807,370
[45] Date of Patent: Feb. 28, 1989

[54] ADJUSTABLE TUBE BENDING PATTERN DEVICE

[75] Inventor: Paul M. Trimble, Aurora, Colo.

[73] Assignee: Anterior, Inc., Aurora, Colo.

[21] Appl. No.: 70,190

[22] Filed: Jul. 6, 1987

[51] Int. Cl.[4] .............................................. G01B 21/00
[52] U.S. Cl. ........................................ 33/529; 33/562;
33/21.3; 138/120; 138/155; 285/181
[58] Field of Search .................. 72/467, 369; 138/104,
138/120, 155, DIG. 8; 285/18, 31, 93, 166, 168,
181; 403/4, 27, 46, 59, 60, 103; 425/391, 393;
33/529, 21.3, 565, 562, 21.1, 1 G, 27.01, 27.12,
495, 500

[56] References Cited

U.S. PATENT DOCUMENTS

| | | | |
|---|---|---|---|
| 1,068,386 | 7/1913 | Dawson | 285/181 |
| 1,520,143 | 12/1924 | Sandell | 33/529 |
| 1,859,449 | 5/1932 | MacKenzie | 285/181 |
| 2,423,069 | 6/1947 | McElhose | 285/181 |
| 2,459,823 | 1/1949 | Lebedeff | 33/21.3 |
| 2,823,703 | 2/1958 | Nusser | 138/120 X |
| 3,060,972 | 10/1962 | Sheldon | 128/4 X |
| 3,071,161 | 1/1963 | Ulrich | 138/120 |
| 3,162,214 | 12/1964 | Bazinet | 138/120 |
| 3,455,142 | 7/1969 | Roberts | 72/466 |
| 3,492,715 | 2/1970 | Maton | 33/529 |
| 3,497,083 | 2/1970 | Anderson et al. | 138/120 X |
| 4,432,349 | 2/1984 | Oshiro | 138/120 X |

FOREIGN PATENT DOCUMENTS

| | | | |
|---|---|---|---|
| 561946 | 9/1932 | Fed. Rep. of Germany | 33/21.3 |
| 59-81506 | 5/1984 | Japan | 33/562 |

*Primary Examiner*—James E. Bryant, III

[57] ABSTRACT

An adjustable tube bending pattern device which is shaped to be readily and accurately formed into a wide variety of shapes so that it can be shaped to go around or avoid with sufficient clearance all obstacles, retain its shape but which can be reshaped and reused many times, to be used to form in place a precise pattern of a complex shaped tube or pipe which is then used as a pattern to accurately bend a tube or pipe to fit the intended use.

5 Claims, 4 Drawing Sheets

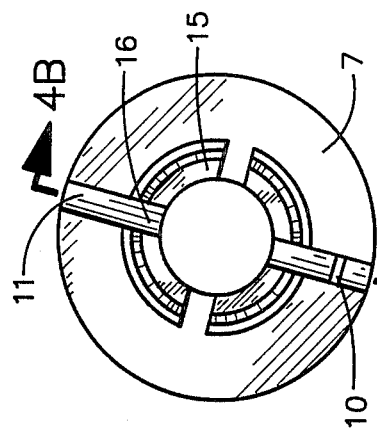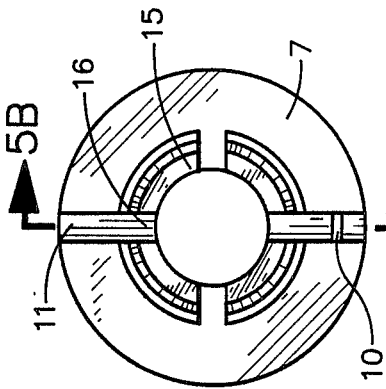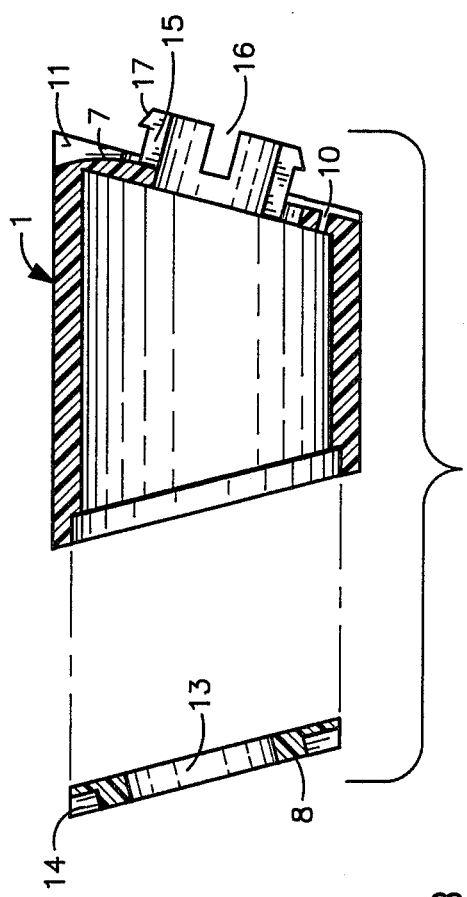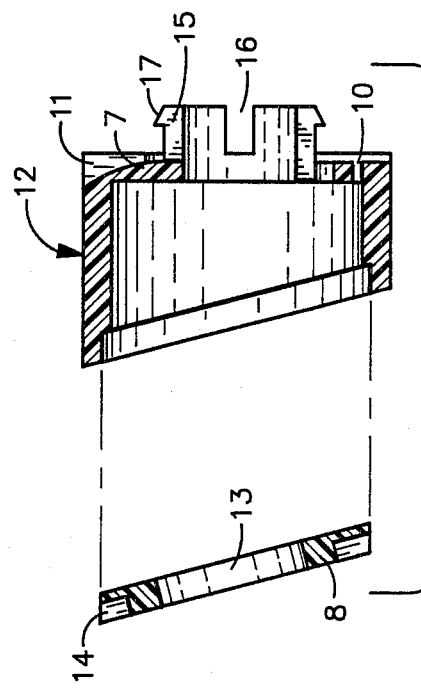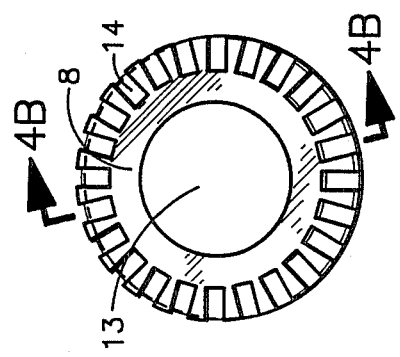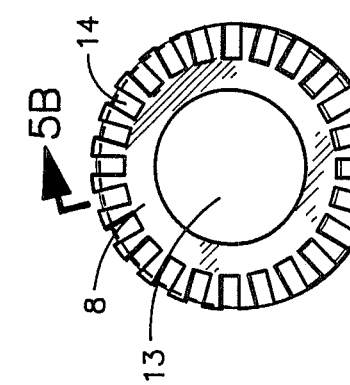

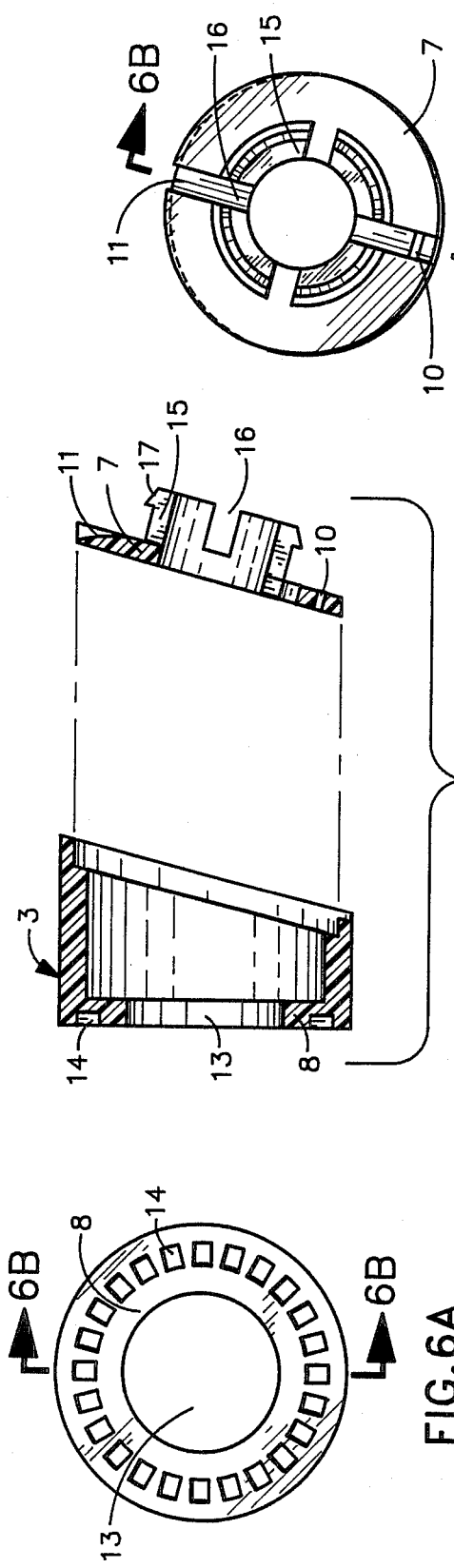
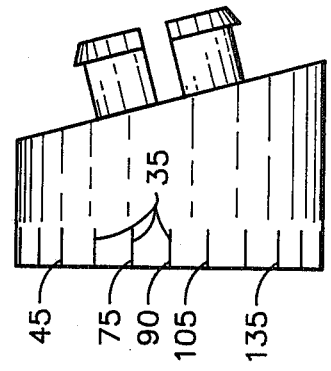
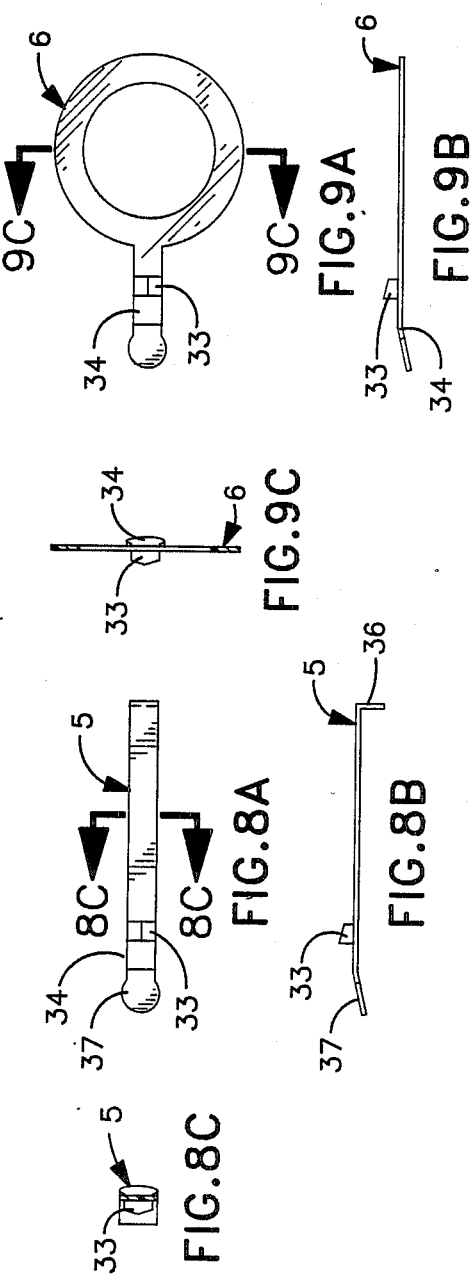

ADJUSTABLE TUBE BENDING PATTERN DEVICE

This invention relates to an adjustable tube bending pattern device used to form in place, a precise pattern of a complex bent tube or pipe to fit the intended use. The primary use, though not the only use, is to fit exhaust pipes and tail pipes into the exhaust systems of automobiles. With the means presently available it is difficult, time consuming and wasteful to form such pipes by trial and error method. I have therefore invented an adjustable tube bending pattern device which is adapted to be readily and accurately formed into a wide variety of shapes to go around or avoid with sufficient clearance all obstacles; retain its shape but which can be reshaped and reused many times. Moreover this is accomplished without bending its component parts; the tube bends but its component parts do not, retaining their form regardless of the curvature given the tube. The accompanying drawings show a relatively short adjustable tube bending pattern device consisting of a series of components suitable for most uses, but it is to be understood that tube bending patterns of any length can be made according to my invention. The tube bending pattern thus formed is then used as a pattern to accurately bend a tube or pipe to fit the intended use.

IN THE DRAWINGS

Figure 2:
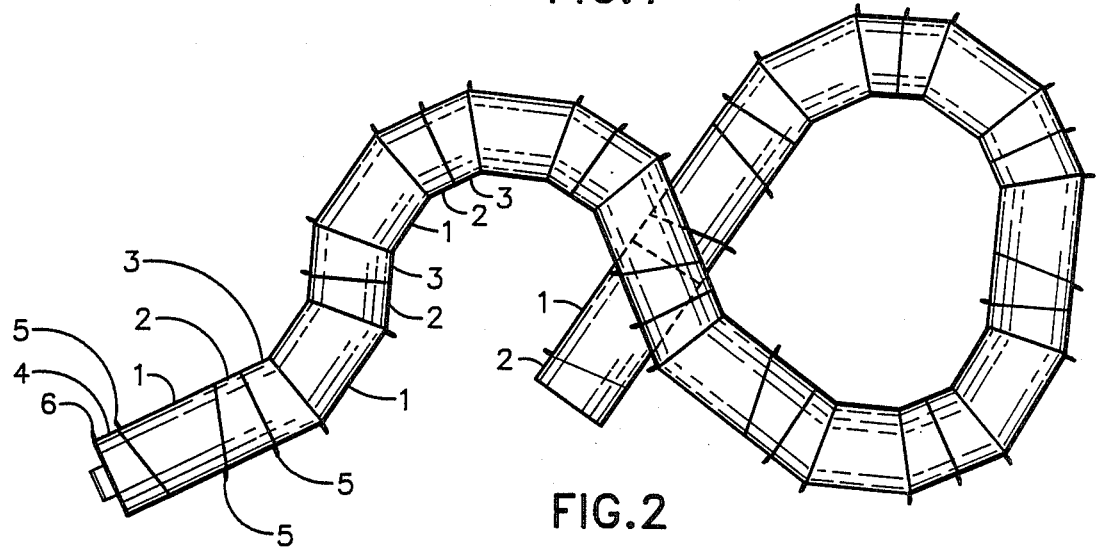
Figure 3:
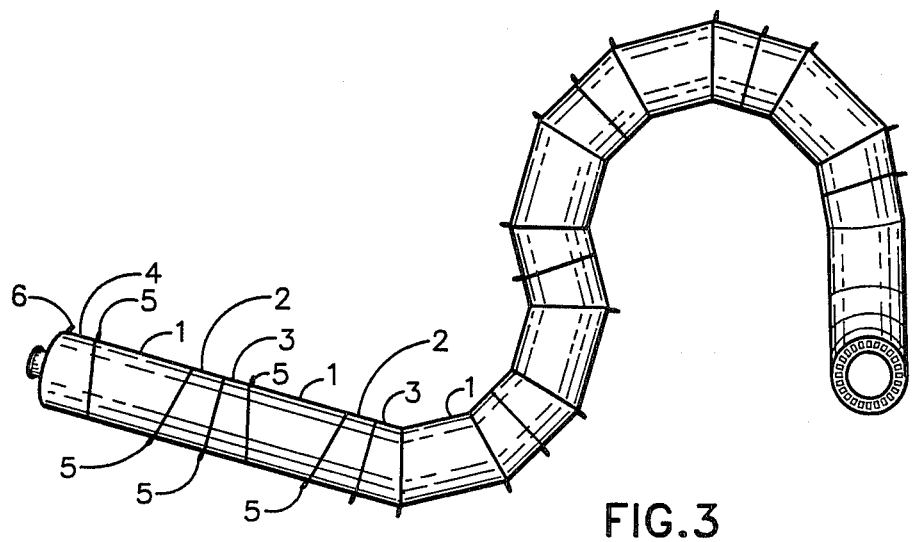

FIGS. 1, 2, and 3 are views of a preferred form of an adjustable tube bending pattern device showing some different forms the device may be made to assume. The various forms of the device are attained by turning the tubular components to different relative positions. Turning the tubular component 1 shown in FIG. 4 relative to the tubular component 2 shown in FIG. 6 alters the curvature of the device at their junction; turning the tubular component 2 shown in FIG. 6, relative to the tubular component 3 shown in FIG. 5, does not alter the curvature of the device at their juntion but does alter the plane of curvature of the following curve, thus it can be readily seen that a wide variety of curves with various radii and lengths can be shaped, followed by a wide variety of curves in various planes.

Referring in more detail to the drawings, a preferred form of invention is shown in FIGS. 1, 2, and 3 in which an adjustable tube bending pattern device is broadly comprised of a series of tubular components beginning with tubular component 4 containing a releasable cam operated connection, followed in series by tubular components 1, 2, 3, 1, 2, 3, continuing to the desired length but always ending with tubular component 2. Tubular component 4 allows sections of the adjustable tube bending pattern device to be attached and detached, thus providing an adjustable tube bending pattern device of the proper length for the job at hand. FIG. 4 is a view of the first tubular component 1 of the preferred form. The first end piece 7 of the tubular component 1 being positioned at a 75 degree angle to the center line of the first tubular component 1 and the second end piece 8 being positioned at a 75 degree angle to the center of the first tubular component 1 and rotated 180 degrees in relationship with the first end piece 7.

The first end piece 7 has a protrusion referred to hereafter as a snap fit tube 15, centered on its surface and at a 90 degree angle to its surface and of a sufficient length. The outside diameter of the snap fit tube 15 being equal to the diameter of the centered hole 13 in the opposing second end piece 8 of the preceding tubular component. The snap fit tube 15 has four snap fit tube slots 16 cut out its length of a sufficient width to allow the flat spring 5 to extend through the snap fit tube slots 16. Each remaining portion of the snap fit tube 15 has a lip 17 on the outside of the outer most end at a distance from the surface of the first end piece 7 equal to the thickness of the second end piece 8 of the preceding tubular component 4 thus allowing the lips 17 to ride over and engage the inner surface of the opposing second end piece 8 when the snap fit tube is fully inserted into the centered hole 13 of the opposing second end piece 8 of the preceding tubular component, thereby locking the two tubular components together.

Figure 7A:
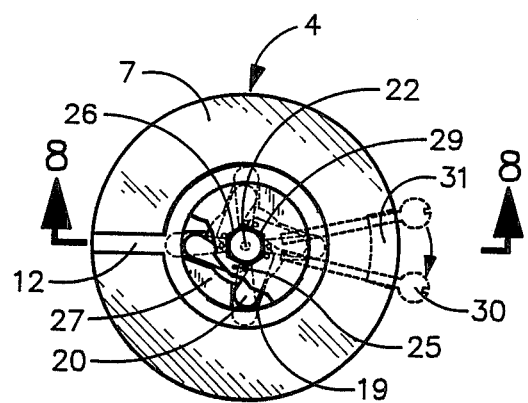
Figure 7:
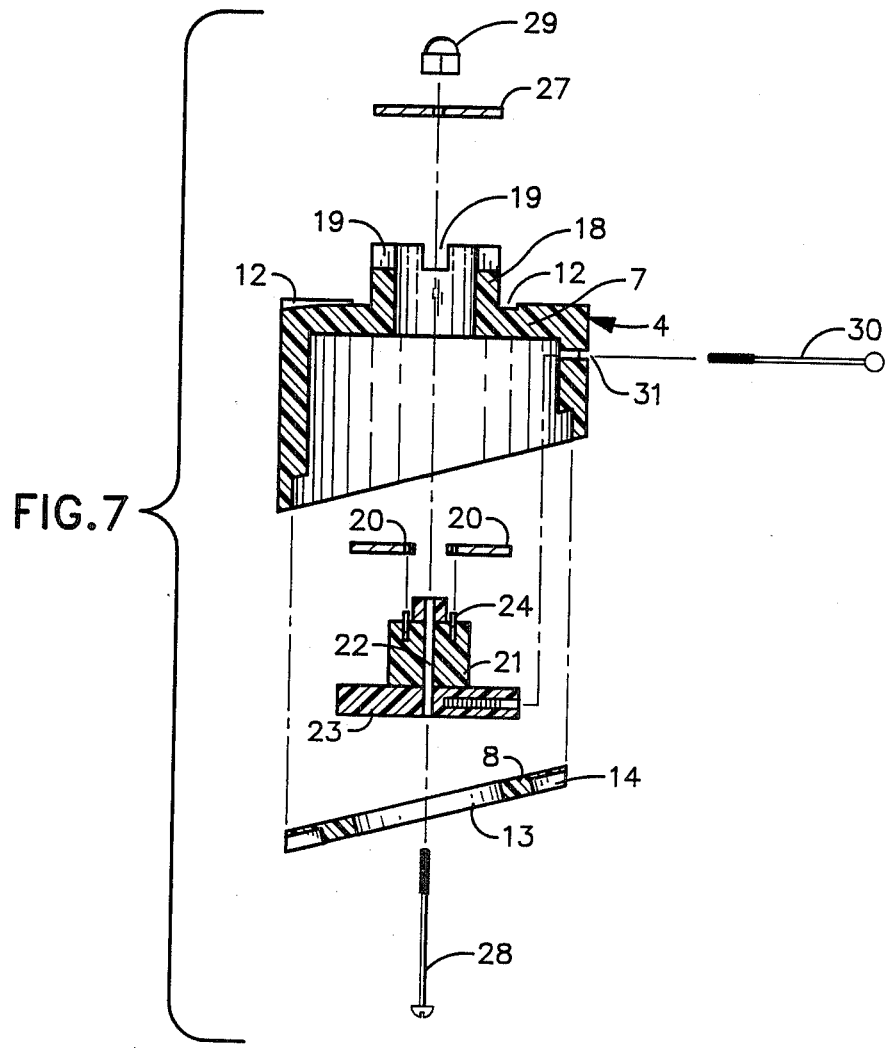

The surface of the first piece 7 has a spring slot 10 cut into its surface with the spring groove 11 extending from the spring slot 10 through two of the snap fit tube slots 16 and extending through the outer edge of the first piece 7. The spring groove 11 being of sufficient width and depth to allow the flat spring 5 to be fitted into it. The spring groove 11 is cut deeper into the surface as it approaches the outer edge of the first end piece 7 so that the flat spring 5 can be depressed into the spring groove 11 allowing the nipple 33 to be withdrawn from engagement with the indentations 14 on the surface of the second end piece 8 of the preceding tubular component. FIG. 5 is a view of the tubular component 3 of the preferred form. Tubular component 3 is identical to tubular component 1 shown in FIG. 4 except it is one half the length and the first end piece 7 is positioned at a 90 degree angle to the center line of tubular component 3. FIG. 6 is a view of tubular component 2 of the preferred form. Tubular component 2 is identical to the tubular component 1 shown in FIG. 4 except it is one half the length and the second end piece 8 is positioned at a 90 degree angle to the center line of tubular component 2. FIG. 7 is an exploded view of tubular component 4 containing the releasable cam operated connection of the preferred form. The first end piece 7 of tubular component 4 being positioned at a 90 degree angle to the center line of the tubular component 4. The tube 18 is centered on, attached to and becomes an integral part of the first end piece 7 with four tube slots 19 being cut into outer most end of the tube 18 of a size sufficient to allow the four fingers 20 to slide into the tube slots 19. A cylinder 21 with a relatively small center bore 22 and with one end of a larger diameter acting as a stop 23 is inserted into tube 18 so that the stop 23 strikes the inner surface of the first piece 7 and a length such that it extends into the tube 18 so that its end is even with the tube slots 19. Four off center pins 24 are positioned on the end of the cylinder 21 so that each is centered on a tube slot 19 at a distance from edge of the cylinder 21 approximately equal to one eighth the cylinder diameter and at a 90 degree angle to the cylinder end. A finger 20 is placed on each off center pin 24 so that the pin extends into the finger bore 25, the fingers extending into the tube slots 19 in tube 18. A bolt 28 is inserted into the cylinder bore 22 from the cylinder stop 23 end, the tubular spacer 26 then the washer 27 are placed on the outer most end of the bolt 28 and secured in place by placing lock nut 29 in place on bolt 28. The cylinder 21 must be free to turn within the tube 18 with very little end play when the bolt 28 and lock nut 29 are securely in place.

A lever 30 is attached to the cylinder stop 23, extending through the lever opening 31 in the side wall of tubular component 4 a sufficient distance to allow hand manipulation of the lever 30. The lever opening 31 being of sufficient length to allow the lever 30 to rotate the cylinder 21 through an arc of approximately 50 degrees causing the fingers 20 to be fully extended at one end of the arc thus allowing the fingers 20 to ride over the inner surface of the opposing second end piece 8 when the tube 18 is fully inserted into the centered hole 13 of the opposing second end piece 8 thus locking the two tubular components 4 and 2 together but allowing them to be rotated independently, while at the other end of the arc the fingers 20 will be fully withdrawn thus releasing the two tubular components.

The washer spring 6 is pressed into place around the tube 18, fitting into the washer spring groove 12 which is cut into the surface of the first end piece 7 around the base of tube 18 with one portion extending to the outer edge of the first end piece 7. The washer spring groove 12 being of sufficient size and depth for the washer spring 6 to be fitted into it. The washer spring groove 12 is cut deeper into the surface of the first end piece as it approaches the outer edge so that the washer spring protrusion 34 can be depressed into the washer spring groove 12 allowing the nipple 33 to be withdrawn from engagement with the indentations 14 on the surface of the second end piece 8 of the preceding tubular component.

The second end piece 8 of preferred form of tubular component 4 is positioned at an angle of 75 degrees to the center line of the fourth tubular component 4. A center hole 13 is centered on the second end piece 8 and drilled at a 90 degree angle to the surface of the end piece 8 of a size equal to the outside diameter of the tube 18. Indentations 14 are cut into the outer edge of the surface of the second end piece 8 of a sufficient size and positioned to engage the nipple 33 on the flat spring 5, each of the indentations 14 being placed 15 degrees of arc apart. FIG. 8 is three views of the flat spring 5 which is placed between the junctions of all tubular components except tubular component 4 containing the releasable cam operated connection. The flat spring 5 is made of spring steel being of a width and thickness necessary to hold the nipple 33 in place in the indentations 14 of the opposing second end piece 8 until the flat spring 5 is depressed into the spring groove 11. The flat spring 5 has a 90 degree bend 36 at one end being fitted into the spring slot 10 when assembled and a 45 degree bend 37 in the other end and in the same direction as the 90 degree bend 36. The flat spring 5 has a length sufficient to allow the outer end to extend beyond the outer edge of the first end piece 7 a sufficient distance to allow hand manipulation. The nipple 33 is positioned on the flat spring 5 so that it engages the indentations 14 on the opposing second end piece 8 when in place between the tubular components. FIG. 9 is three views of the washer spring 6 which is placed in the junction between tubular component 4 containing the releasable cam operated connection and tubular component 2 preceding it in the device. The washer spring 6 is made of spring steel of a width and thickness necessary to hold the nipple 33 in place in the indentations 14 of the opposing second end piece 8 until the washer spring protrusion 34 is depressed into the washer spring groove 12. The washer spring 6 consists of one relatively large end in the form of a washer with a center hole in it sufficient to allow it to be pressed into place around the tube 18, fitting into the washer spring groove 12 on the face of the first end piece 7 and a washer spring protrusion 34 extending from the large round end a sufficient distance beyond the outer edge of the first end piece 7 to allow hand manipulation. The nipple 33 is positioned on the washer spring 6 so that it engages the indentations 14 on the opposing second end piece 8 when in place between the tubular components. FIG. 10 shows a tubular component containing markings 35. All tubular components 1, 2, 3, and 4 may have markings on their outer surface so that the degree of rotation of each tubular component with respect to its preceding or following tubular component can be noted.

It will be noted in accordance with the forms of invention herein set forth that each of the tubular components except the tubular component containing the releasable cam operated connection shown in FIG. 7 are of one-piece integral construction, and the flat springs 5 are constructed independent of the tubular components. In assembly of the preferred form of invention, each section begins with the tubular component 4 containing the releasable cam operated connection shown in FIG. 7 followed by tubular component 1 shown in FIG. 4 with a flat spring 5 in place between them. The snap fit tube 15 of tubular component 1 with the flat spring 5 in place in the spring groove 11 is fully inserted into the center hole 13 of the preceding tubular component until the lips 17 ride over the inner surface of the end piece locking the two tubular components in place with the flat spring 5 in place between then. The series is continued in the same manner with tubular components 2, 3, 1, 2, 3, 1, 2, 3, to the desired length but always ending with tubular component 2. The tubular component 4 containing the releasable cam operated connection allow sections of the adjustable tube bending pattern device to be attached and detached thus providing the most useable length for the job at hand.

Although the invention has been described with reference to the preferred form thereof, it will be appreciated that various modifications and changes may be made without departing from the spirit and scope of the present invention as set forth in the accompanying claims.

I claim:

1. An adjustable tube bending pattern device used to form in place a pattern of a complex bent tube or pipe, comprising:
   (a) a plurality or relatively short straight tubular components with end pieces fixed at right and acute angles interconnected and arranged in end to end relation, each said tubular component being rotatable with respect to other said tubular components to which it is interconnected,
   (b) a means of locking said tubular components together,
   (c) a means of controlling and locking the degree of rotation between said tubular components, and
   (d) a serial arrangement of said tubular components with recurring configurations of said end pieces positioned at right angles and positioned at acute angles, whereby said serial arrangement allows patterning of tubes and pipes with bends of different angles and in different planes.

2. An adjustable tube bending pattern device used to form in place a pattern of a complex bent tube or pipe, comprising:
   (a) a plurality of relatively short straight tubular components, interconnected and arranged in end to end relation, there being a first of said tubular components, a second of said tubular components and a third of said tubular components of which type are repeated consecutively in order to form a pattern for a bent tube of any desired length, (b) a first end piece on one end of said first tubular component positioned at a right angle with respect to the axis of said first tubular component and a second end piece on the other end of said first tubular component positioned at an acute angle with respect to the axis of the said first tubular component, (c) a third end piece on one end of said second tubular component positioned at said acute angle with respect to the axis of the said second tubular component and a fourth end piece on the other end of said second tubular component positioned at said acute angle but diametrically opposed with respect to the axis of said second tubular component, (d) a fifth end piece on one end of said third tubular component positioned at said acute angle with respect to the axis of said third tubular component and a sixth end piece on the other end of said third tubular component positioned at a right angle with respect to the axis of said third tubular component, (e) a locking means of joining and disjoining said tubular components together in series while remaining individually rotatable, effected by said first end piece, said third end piece and said fifth end piece being of one kind and said second end piece, said fourth end piece and said sixth end piece being of a second kind such that end pieces of one kind are joinable to end pieces of the second kind, (f) a controlling means of varying and holding the amount of rotation between said tubular components, so that a bent tube or pipe pattern can be formed with a variety of bends at various angles in different planes.

3. An adjustable tube bending pattern device used to form in place a pattern of a complex bent tube or pipe as described in claim 2 where said locking means consists of a snap fit tube centered on and joined to all end pieces of said second kind and a corresponding recepticle fitting centered on and joined to all end pieces of said first kind.

4. An adjustable tube bending pattern device used to form in place a pattern of a complex bent tube or pipe as described in claim 2 where said locking means consists of a releasable cam operated connection, comprising a short tube joined to, centered on and extending from end pieces of said second kind, a fitting being equipped with a plurality of fingers; a withdrawing and extending means for said plurality of fingers to grasp said snap fit tube and lock it into correspondance with said fitting; and said withdrawing and extending means communicating to a lever positioned to the outside surface of said adjustable tube bending pattern device.

5. An adjustable tube bending pattern device used to form in place a pattern of a complex bent tube or pipe as described in claim 2 where the controlling means consists of a releasable spring device positioned between said tubular components at their interconnection, said releasable spring device being comprised of a thin flat spring attached to an end piece of said second kind having a nipple which is positioned to engage indentations in an end piece of said first kind; and a means of retracting the spring to disengage said nipple from said indentations allowing said tubular components to be rotated with respect to one another.

* * * * *